United States Patent
Puriefoy et al.

(10) Patent No.: US 7,097,731 B2
(45) Date of Patent: Aug. 29, 2006

(54) METHOD OF MANUFACTURING A HOLLOW SECTION, GRID STIFFENED PANEL

(75) Inventors: Milton Puriefoy, Abingdon, VA (US); Michael D. Halsey, Marion, VA (US)

(73) Assignee: General Dynamics Armament and Technical Products, Inc, Marion, VA (US)

( * ) Notice: Subject to any disclaimer, the term of this patent is extended or adjusted under 35 U.S.C. 154(b) by 355 days.

(21) Appl. No.: 10/473,758

(22) PCT Filed: Apr. 4, 2002

(86) PCT No.: PCT/US02/10982

§ 371 (c)(1),
(2), (4) Date: Oct. 2, 2003

(87) PCT Pub. No.: WO02/081210

PCT Pub. Date: Oct. 17, 2002

(65) Prior Publication Data

US 2004/0140049 A1 Jul. 22, 2004

Related U.S. Application Data

(60) Provisional application No. 60/281,984, filed on Apr. 6, 2001.

(51) Int. Cl.
*B32B 37/12* (2006.01)

(52) U.S. Cl. .............. 156/292; 156/212; 156/221; 156/222; 156/307.1; 264/257; 264/258; 264/324

(58) Field of Classification Search ............. 156/289
See application file for complete search history.

(56) References Cited

U.S. PATENT DOCUMENTS

| | | | | |
|---|---|---|---|---|
| 4,946,526 A | * | 8/1990 | Petty-Galis et al. | ........ 156/155 |
| 4,966,802 A | * | 10/1990 | Hertzberg | ............... 428/119 |
| 6,638,466 B1 | * | 10/2003 | Abbott | ..................... 264/238 |

FOREIGN PATENT DOCUMENTS

DE       19617699 A1 * 11/1997

* cited by examiner

*Primary Examiner*—Jessica Rossi
(74) *Attorney, Agent, or Firm*—Hunton & Williams

(57) ABSTRACT

A method of manufacturing a hollow section grid-stiffened panel comprises providing a tool (10) having a surface (12). The stiffened skin composite panel is preassembled comprising laminating a composite outer skin (14) on the surface, placing a separator outer layer (16) on the composite outer skin (14), and laminating a composite stiffener (20) on the mandrel (18), the mandrel being positioned on the separator layer (16), wherein the separator layer (16) separates the stiffener (20) and the mandrel (18) from the outer composite skin (14). The preassembled outer skin composite panel is cured on the tool. The separator layer (16) and mandrel (18) are removed from the preassembled stiffened skin composite panel. The stiffened skin composite panel is reassembled, comprising applying an adhesive between the composite outer skin (14) and the composite stiffener (20). The reassembled stiffener skin composite panel is cured on the tool to bond the stiffener skin to the outer skin.

26 Claims, 5 Drawing Sheets

METHOD OF MANUFACTURING A HOLLOW SECTION, GRID STIFFENED PANEL

This application claims the benefit of provisional application No. 60/281,984 filed Apr. 6, 2001.

FIELD OF THE INVENTION

The invention is directed to manufacture of stiffened skin composite panels and, more particularly, to a method of manufacturing a hollow section, grid stiffened panel.

BACKGROUND OF THE INVENTION

Stiffened skin composite panels are frequently used to replace composite skin, honeycomb sandwich panels used for fairings and close-out panels on aircraft or other lightweight structures. One problem with using a stiffened skin composite panel to replace a sandwich panel is weight. In a conventional method of manufacturing a stiffened skin composite panel, structural foam is used as a mandrel over which stiffeners are laminated. The foam mandrel generally remains in place in the finished panel. Inclusion of the foam mandrel results in overall panel weight that exceeds that of a comparable performance sandwich panel. This increased weight is generally intolerable.

One alternative conventional approach to manufacturing a stiffened skin composite panel which results in hollow stiffeners is to produce a tool on which the skin portion of the panel is laminated and another tool on which the stiffener portion of the panel is fabricated. Such tools are expensive and this option for manufacturing is often not economically feasible. Another problem with this approach is the fit between the components after they are fabricated on separate tools. Raw material variability also exacerbates the problems in a production setting. These problems tend to eliminate a stiffened skin composite panel concept in many instances.

Another general problem with composite skin sandwich panel fairings is the eventual accumulation of moisture in the honeycomb cells. The moisture degrades the structural performance of the panels as well as increases the weight of the assembly. Hollow stiffeners with drain holes prevent the accumulation of moisture and all of the associated problems.

The present invention is directed to overcoming one or more of the problems discussed above, in a novel and simple manner.

SUMMARY OF THE INVENTION

In accordance with the invention, there is provided a method of manufacturing a stiffened skin composite panel.

Broadly, the method comprises providing a tool having a surface. A stiffened skin composite panel is preassembled comprising laminating a composite outer skin on the surface, placing a separator layer on the composite outer skin, and laminating a composite stiffener on the mandrel, the mandrel being positioned on the separator layer, wherein the separator layer separates the stiffener and mandrel from the composite outer skin. The preassembled stiffened skin composite panel is cured on the tool. The separator layer and mandrel are removed from the preassembled stiffened skin composite panel. The stiffened skin composite panel is reassembled, comprising applying an adhesive between the composite outer skin and the composite stiffener. The reassembled stiffened skin composite panel is cured on the tool to bond the stiffener to the outer skin.

Alternatively, the method comprises manufacturing a hollow section, grid stiffened panel, comprising providing a tool having a surface. The grid stiffened composite panel is preassembled, comprising laminating a composite outer skin on the surface, placing a separator layer on the composite outer skin, and laminating a composite grid stiffener on a grid shaped mandrel, the mandrel being positioned on the separator layer, wherein the separator layer separates the grid stiffener and the mandrel from the composite outer skin. The preassembled stiffened skin composite panel is cured on the tool. The separator layer is removed. The mandrel is removed from the preassembled stiffened skin composite panel. The grid stiffened skin composite panel is reassembled, comprising applying an adhesive between the composite outer skin and the composite grid stiffener to provide a hollow cross section defined by the composite outer skin and the composite grid stiffener. The reassembled stiffened skin composite panel is cured on the tool to bond the grid stiffener to the outer skin.

Further features and advantages of the invention will be readily apparent from the specification and from the drawings.

DETAILED DESCRIPTION OF THE INVENTION

As described in greater detail below, a stiffened skin panel structure uses a silicon rubber mandrel on which stiffeners are laminated with the rubber mandrel positioned on a previously laminated outer skin. A separator layer is laid up between the skin and the stiffener laminates. Once the assembly is "cured" in an oven or autoclave, then the parts are separated and subsequently bonded together at the split line.

The method in accordance with the invention generally comprises preassembling a grid stiffened skin composite panel on a tool, then cocuring the preassembled stiffened composite panel on the tool, removing a separator layer and a mandrel used in the preassembling step, reassembling the grid stiffened skin composite panel and curing a bond line in the reassembled stiffened skin composite panel.

The described method is advantageously used for forming a composite skin panel used on the wing of an airplane, also referred to as a "fairing." The method can also be used for manufacturing other types of composite panels that might be used on aircraft or other lightweight structures. The method produces a hollow section, grid stiffened panel to provide a lightweight structure having sufficient strength while saving on tooling costs. The latter feature is accomplished by using a single tool for both the preassembling and reassembling of the grid stiffened composite panel during the manufacturing process along with a rubber mandrel and separator layer, as described more particularly below.

Figure 1:
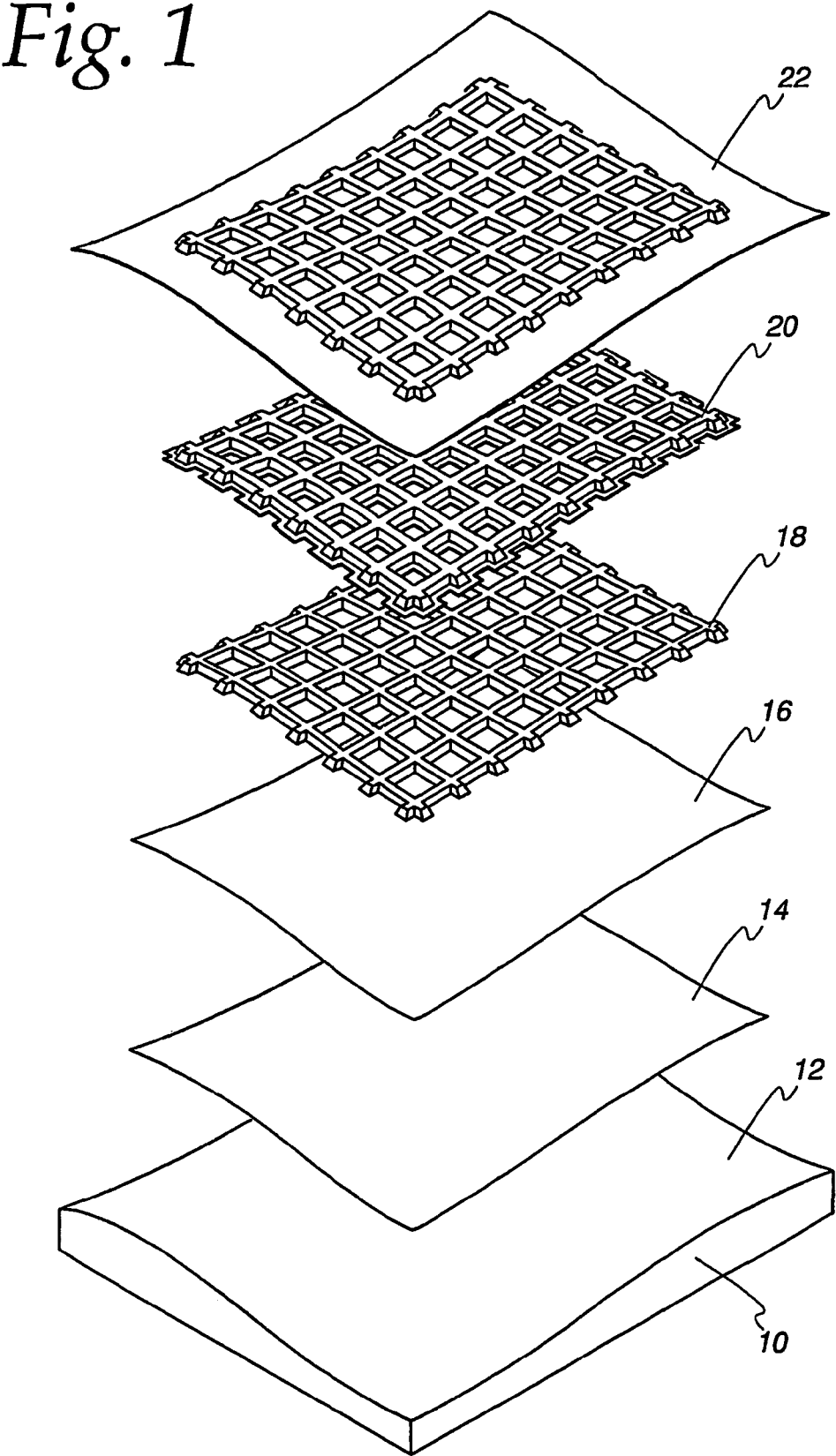
FIG. 1 is an exploded view of a first operation for a method of manufacturing a stiffened skin composite panel comprising preassembling the stiffened skin composite panel.

Referring initially to FIG. 1, the preassembling step is generally illustrated and described. A tool in the form of a mold 10 has a surface 12. The surface 12 defines the desired shape of the composite panel to be produced. As such, the surface 12 could be planar, or could be contoured, as shown, as necessary for the composite panel to be produced.

A composite outer skin 14 is laid up on the tool surface 12. This step conventionally comprises laying up, or laminating, the required number of face sheet plies on the tool surface 12. Most typically, the outer skin 14 comprises laminates of fiber reinforced plastic. A fabric is pre-impregnated with resin which will bond the laminate during a subsequent curing operation.

A separator layer 16 is placed on the laminated composite outer skin 14. Generally, the separator layer 16 comprises a material that would not adhere to resin. Particularly, the separator layer 16 is of a material, which may be coated, selected so that it does not adhere to the other layers or melt. Polyethylene or Teflon® film may be used as the separator layer 16. Additionally, the separator layer 16 should leave no residue that would inhibit bonding in subsequent operations.

A mandrel 18 is oriented and fixed on the separator layer 16. The particular shape of the mandrel 18 defines the grid configuration and hollow cross section to be produced. In the illustrated embodiment of the invention, the mandrel 18 comprises a rubber mandrel, such as of silicon rubber. The mandrel 18 is precured and will not melt at curing temperatures to be used. When used with a contoured tool surface 12, the mandrel 18 is flexible to take the shape of the contoured surface 12. In the illustrated embodiment of the invention, the mandrel 18 includes angled walls to provide a trapezoidal configuration in cross section. While not required, the trapezoidal configuration facilitates removal and renders it easier to consolidate stiffener laminates.

A stiffener laminate 20 is next laid up on the rubber mandrel 18. The stiffener laminate is formed of pre-impregnated fiber material (woven fabric or uni-directional), similar to the outer skin 14. In the illustrated embodiment of the invention, the stiffener laminate 20 resembles a single piece structure having a defined shape corresponding to that of the grid shaped mandrel 18. This is its finished appearance removed from the mandrel 18. As is known to those skilled in the art, the stiffener laminate 20 is laid up by laminating strips of fiber reinforced plastic over the grid structure of the mandrel 18 in two directions to leave openings corresponding to openings in the grid of the mandrel 18. The drawing illustrates the stiffener laminate 20 after lay up is completed.

Prior to cocuring the preassembled stiffened skin composite panel, a formed rubber caul sheet 22 is placed over the stiffened skin composite panel and sealed to the mold 10 in a conventional manner. The caul sheet 22 is flexible and may be formed of silicon rubber approximately ⅛ inch thick. It is formed to resemble the profile of the rubber mandrel 18.

Figure 2:
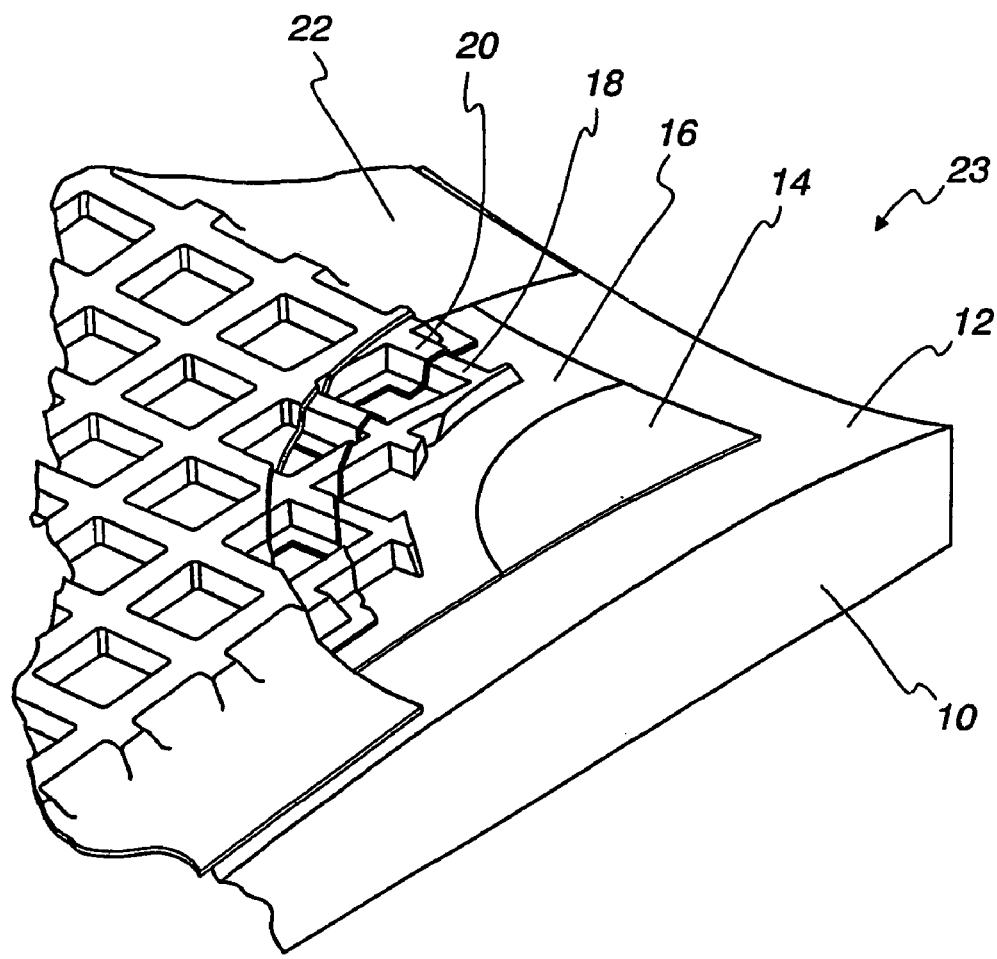
FIG. 2 is a partial, cut away perspective view illustrating the preassembled stiffened skin panel.

A resultant preassembled stiffened skin composite panel 23 is illustrated in greater detail in FIG. 2, with parts cut away for clarity. Specifically, the outer skin 14 is laminated on the tool surface 12. The separator layer 16 is on the composite outer skin 14. The composite stiffener 20 is laminated on the mandrel 18, the mandrel 18 being positioned on the separator layer 16. As a result, the separator layer 16 separates the stiffener 20 and mandrel 18 from the composite outer skin 14.

This preassembled stiffened skin composite panel 23 is cocured in an oven, an autoclave or a free standing cure with autoclave pressure, vacuum pressure, mechanical pressure or ambiant conditions, in a conventional manner. The heat and pressure applied to the preassembled stiffened skin composite panel 23 during this cocuring operation causes the outer skin 14 and stiffener 20 to come into proper shape. The resin in the laminates bonds with fabric in the laminates to form a unitary outer skin 14 and a separate, unitary stiffener 20.

Figure 3:
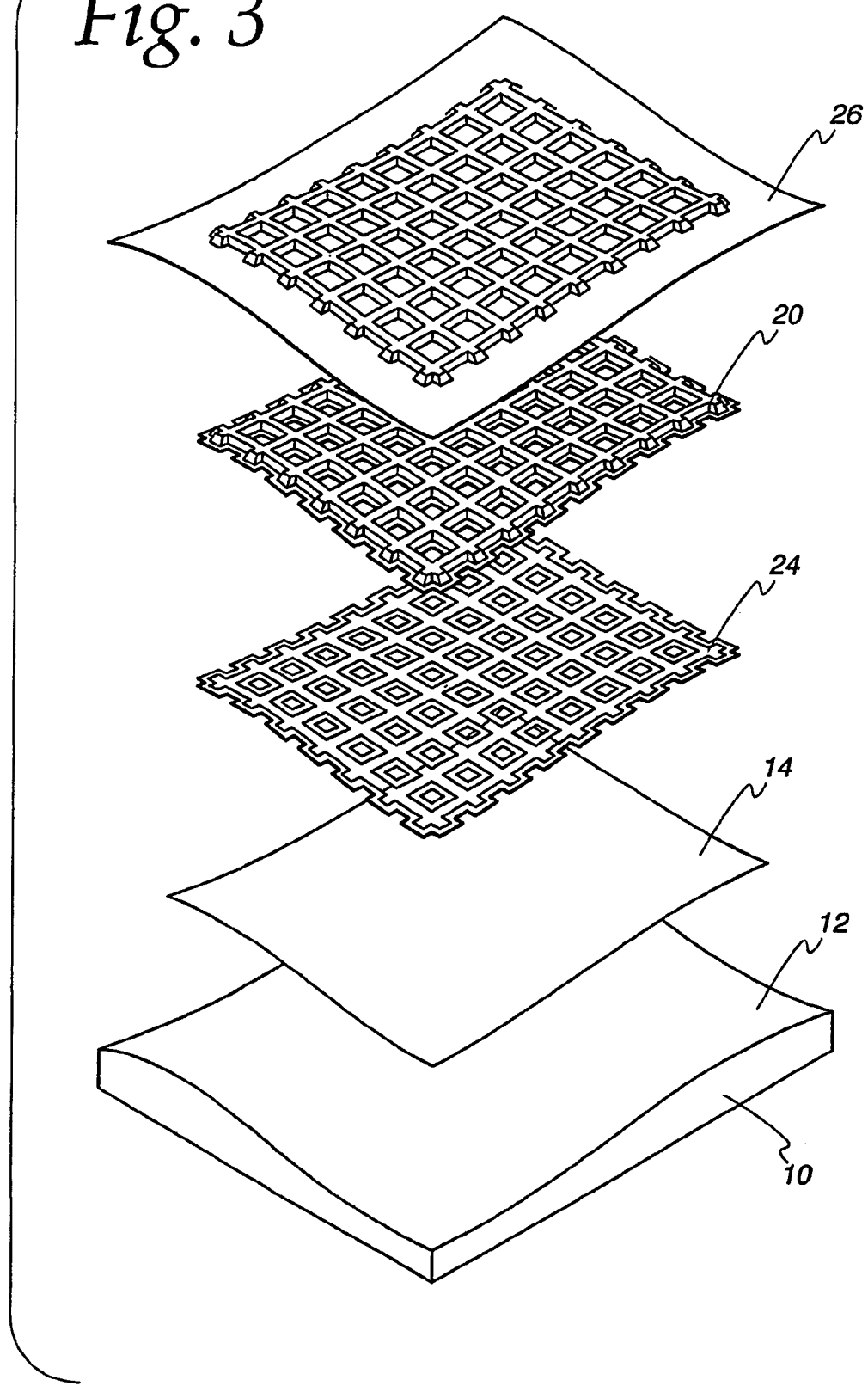
FIG. 3 is an exploded view, similar to FIG. 1, illustrating reassembling the stiffened skin composite panel.

Subsequently, the caul sheet 22 is removed from the tool 10. Next, the stiffener laminate 20 and rubber mandrel 18 are removed from atop the separator layer 16. The separator layer 16 is then peeled from the outer skin 14. After individually inspecting the components, an adhesive layer 24, see FIG. 3, is applied between the outer skin 14 and the stiffener 20. In the illustrated embodiment of the invention, the adhesive 24 is illustrated as an adhesive ply having a configuration corresponding to that of the stiffener 20. Alternatively, the adhesive 24 could be a liquid adhesive applied to either the outer skin 14 or the stiffener 20, or both, as necessary or desired. Next, the stiffener 20 is reassembled onto the outer skin 14 in the same position and orientation as in the first operation described above relative to FIG. 1. A formed rubber caul sheet 26, which is generally similar to the rubber caul sheet 22 of FIG. 1, is then placed over the reassembled stiffened skin composite panel 28 on the tool surface 12.

Figure 4:
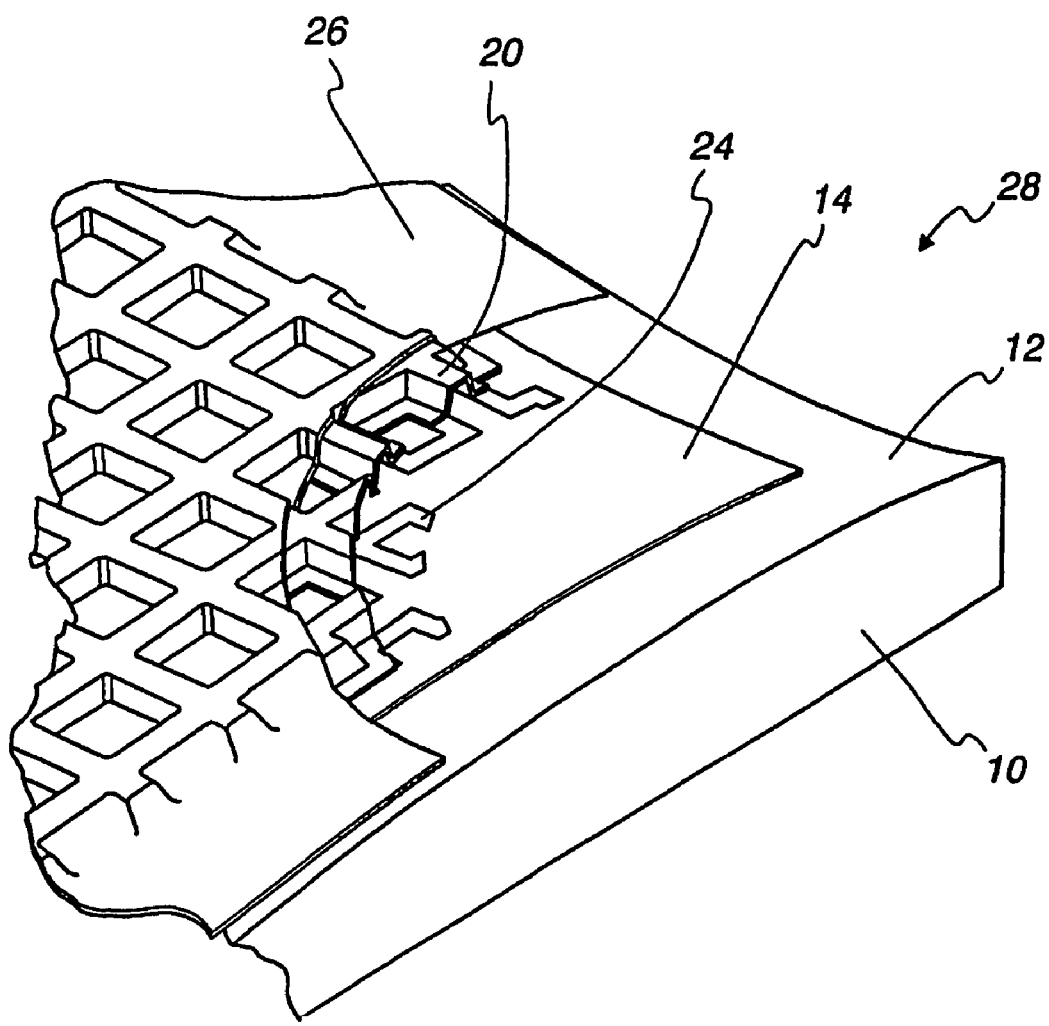
FIG. 4 is a perspective view, similar to FIG. 2, illustrating the reassembled stiffened skin composite panel.

The resultant reassembled stiffened skin composite panel 28 is illustrated in greater detail in FIG. 4, with parts cut away for clarity. Specifically, the outer skin 14 is positioned on the tool surface 12. The adhesive layer 24 is disposed between the composite stiffener 20 and the composite outer skin 14. The caul sheet 26 covers the reassembled stiffened skin composite panel 28.

Figure 5:
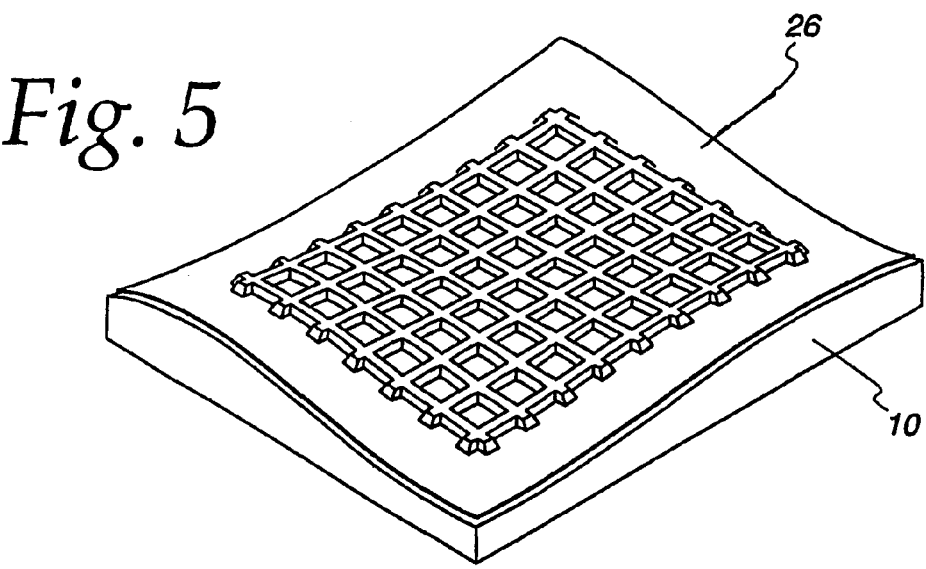
FIG. 5 is a perspective view illustrating the reassembled stiffened skin composite panel ready for a bond curing operation.

The reassembled stiffened skin composite panel 28 is then cured according to recommended cure cycles for the materials being used. FIG. 5 illustrates the reassembled stiffened skin composite panel 28 on the tool 10 covered by the rubber caul sheet 26 ready for the bonding cure. The curing operation bonds the grid stiffener 20 to the outer skin 14 using the adhesive 24.

Figure 6:
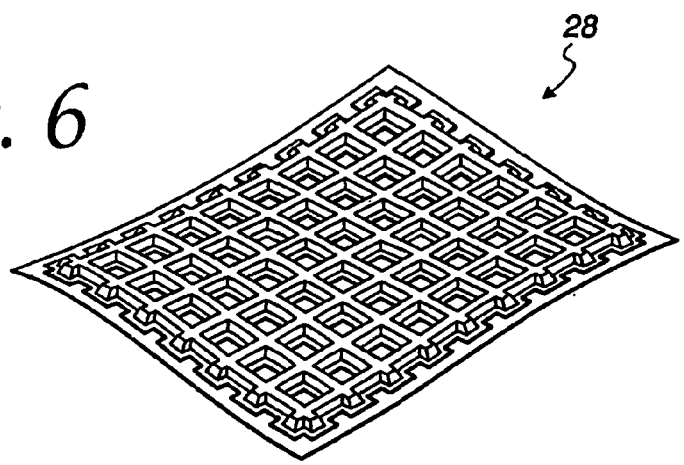
FIG. 6 is a perspective view of the stiffened skin composite panel manufactured according to the method of the present invention.

Using the single mold tool 10 and the single cure operation for the stiffener 20 and outer skin 14, in combination with the removable mandrel, provides a unique fit between the stiffener 20 and skin 14 to produce the reassembled stiffened skin composite panel 28, see FIG. 6.

Figure 7:
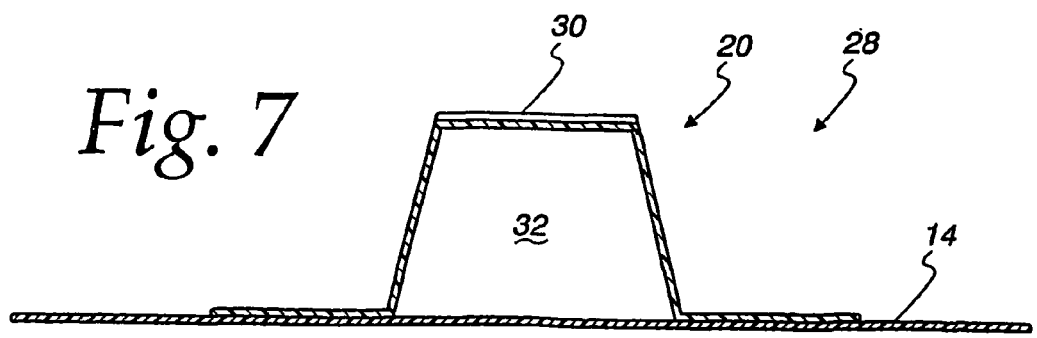
FIG. 7 is a cross sectional view illustrating a portion of the stiffened skin composite panel.

An exemplary cross section of the reassembled stiffened skin composite panel 28 is illustrated in FIG. 7. In the exemplary embodiment, the outer skin 14 comprises three plies of fabric. Similarly, the stiffener 20 comprises three plies of fabric with two layer of tape also included on an outer most wall 30. As is apparent, the stiffener 20 on the outer skin 14 comprises a hollow section 32 which is trapezoidal in cross section corresponding to the cross section of the mandrel 18, as discussed above.

The configuration of FIG. 7 utilizes hat-section stiffeners on a mesh grid network. The stiffener cross section of the pattern of the stiffener grid is optional and can be structurally optimized in a detailed design of a particular fairing or close out panel.

The adhesive 24 provides a bond at an interface between the stiffener 20 and outer skin 14. In the first curing operation, the interface is only separated by the separator layer 16. Thus, the interface produced in the preassembly and first curing operation is the same interface used in the reassembly step and second curing operation to provide a unique fit for the hollow section, grid stiffened panel 28 manufactured as described. Particularly, any potential fit problems between components are eliminated since the parts are cured together but the mating interface is only separated by the separator layer 16.

The resulting overall panel 28 has a weight comparable to that of a honeycomb sandwich stiffened panel by virtue of having hollow stiffeners. Drain holes can easily be added to the hollow stiffeners to preclude the deleterious effects of moisture accumulation.

The method described herein drastically reduces up-front tooling costs since the rubber mandrels can be economically fabricated and are conformable to required panel curvatures or contours.

We claim:

1. The method of manufacturing a stiffened skin composite panel, comprising:
   providing a tool having a surface;
   preassembling the stiffened skin composite panel, comprising
     placing a composite outer skin on the surface,
     placing a separator layer on the composite outer skin, and
     placing a composite stiffener on a mandrel, the mandrel being positioned on the separator layer, wherein the separator layer separates the stiffener and mandrel from the composite outer skin;
   cocuring the preassembled stiffened skin composite panel on the tool;
   removing the separator layer and the mandrel from the preassembled stiffened skin composite panel;
   reassembling the stiffened skin composite panel, comprising applying an adhesive between the composite outer skin and the composite stiffener; and
   curing the reassembled stiffened skin composite panel on the tool to bond the stiffener to the outer skin.

2. The method of claim 1 wherein the composite outer skin and the composite stiffener comprise fiber reinforced plastic.

3. The method of claim 1 wherein the separator layer is selected from polyethylene or polytetrafluoroethylene.

4. The method of claim 1 wherein the mandrel comprises a silicon rubber mandrel.

5. The method of claim 1 wherein cocuring the preassembled stiffened skin composite panel and curing the reassembled stiffened skin composite panel both comprise using an autoclave, an oven or a free standing cure with autoclave pressure, vacuum pressure, mechanical pressure or ambient conditions.

6. The method of claim 1 wherein the cocuring and curing steps comprise providing a caul sheet sealed to the tool.

7. The method of claim 1 wherein the tool surface has a contoured surface.

8. The method of claim 1 wherein the composite outer skin and the composite stiffener comprise resin impregnated fabric.

9. The method of claim 8 wherein the separator layer is formed of a material that does not adhere to the resin.

10. The method of claim 1 wherein the mandrel comprises a formed rubber mandrel.

11. The method of claim 10 wherein the mandrel has a trapezoidal cross section.

12. The method of claim 1 wherein cocuring the preassembled stiffened skin composite panel comprises cocuring the composite stiffener and the composite outer skin having an interface only separated by the separator layer.

13. The method of claim 12 wherein curing the reassembled stiffened skin composite panel comprises the adhesive providing a bond at the interface.

14. The method of manufacturing a hollow section, grid stiffened panel, comprising:
   providing a tool having a surface;
   preassembling the grid stiffened skin composite panel, comprising
     placing a composite outer skin on the surface,
     placing a separator layer on the composite outer skin, and
     placing a composite grid stiffener on a grid shaped mandrel, the mandrel being positioned on the separator layer, wherein the separator layer separates the grid stiffener and mandrel from the composite outer skin;
   cocuring the preassembled stiffened skin composite panel on the tool;
   removing the separator layer;
   removing the mandrel from the preassembled stiffened skin composite panel;
   reassembling the grid stiffened skin composite panel, comprising applying an adhesive between the composite outer skin and the composite grid stiffener to provide a hollow cross section defined by the composite outer skin and the composite grid stiffener; and
   curing the reassembled grid stiffened skin composite panel on the tool to bond the grid stiffener to the outer skin.

15. The method of claim 14 wherein the composite outer skin and the composite grid stiffener comprise fiber reinforced plastic.

16. The method of claim 14 wherein the separator layer is selected from polyethylene or polytetrafluoroethylene.

17. The method of claim 14 wherein the mandrel comprises a silicon rubber mandrel.

18. The method of claim 14 wherein cocuring the preassembled grid stiffened skin composite panel and curing the reassembled grid stiffened skin composite panel both comprise using an autoclave, an oven or a free standing cure with autoclave pressure, vacuum pressure, mechanical pressure or ambient conditions.

19. The method of claim 14 wherein the cocuring and curing steps comprise providing a formed caul sheet sealed to the tool.

20. The method of claim 14 wherein the tool surface has a contoured surface.

21. The method of claim 14 wherein the composite outer skin and the composite grid stiffener comprise resin impregnated fabric.

22. The method of claim 21 wherein the separator layer is formed of a material that does not adhere to the resin.

23. The method of claim 14 wherein the mandrel comprises a formed rubber mandrel.

24. The method of claim 23 wherein the mandrel has a trapezoidal cross section.

25. The method of claim 14 wherein cocuring the preassembled grid stiffened skin composite panel comprises cocuring the composite grid stiffener and the composite outer skin having an interface only separated by the separator layer.

26. The method of claim 25 wherein curing the reassembled grid stiffened skin composite panel comprises the adhesive providing a bond at the interface.

* * * * *